(12) United States Patent
Eriksson et al.

(10) Patent No.: US 8,197,348 B2
(45) Date of Patent: Jun. 12, 2012

(54) TELESCOPIC SHAFT

(75) Inventors: Ulf Eriksson, Eskilstuna (SE); Hans Fredriksson, Torshälla (SE)

(73) Assignee: Fuji Autotech AB, Eskilstuna (SE)

( * ) Notice: Subject to any disclaimer, the term of this patent is extended or adjusted under 35 U.S.C. 154(b) by 246 days.

(21) Appl. No.: 12/601,702

(22) PCT Filed: May 28, 2008

(86) PCT No.: PCT/SE2008/000362
§ 371 (c)(1),
(2), (4) Date: Nov. 25, 2009

(87) PCT Pub. No.: WO2008/147287
PCT Pub. Date: Dec. 4, 2008

(65) Prior Publication Data
US 2010/0130293 A1    May 27, 2010

(30) Foreign Application Priority Data

May 30, 2007  (SE) ...................................... 0701302

(51) Int. Cl.
*F16C 3/035* (2006.01)
(52) U.S. Cl. ........................................ 464/167; 464/169
(58) Field of Classification Search .......... 464/162–169; 74/493; 280/775
See application file for complete search history.

(56) References Cited

U.S. PATENT DOCUMENTS

| | | | | |
|---|---|---|---|---|
| 2,079,536 A | * | 5/1937 | Thurber | ........................ 74/493 |
| 2,179,006 A | * | 11/1939 | Bronzan et al. | ............... 464/166 |
| 3,995,916 A | | 12/1976 | Lange et al. | |
| 6,343,993 B1 | | 2/2002 | Duval et al. | |
| 2007/0026952 A1 | * | 2/2007 | Gokano | ........................ 464/162 |

FOREIGN PATENT DOCUMENTS

| | | |
|---|---|---|
| EP | 0 518 091 A1 | 12/1992 |
| FR | 2 727 481 A1 | 5/1996 |
| JP | 2001-165183 A | 6/2001 |
| JP | 2003-247560 A | 9/2003 |
| JP | 2003-291824 A | 10/2003 |
| WO | WO 2007/013446 A1 | 2/2007 |

* cited by examiner

*Primary Examiner* — Gregory Binda
(74) *Attorney, Agent, or Firm* — Dickstein Shapiro LLP

(57) ABSTRACT

A telescopic shaft for vehicles comprising an inner shaft axially movable in an outer shaft. The telescopic shaft comprises at least two rows of balls with at least one ball per row between the inner shaft and the outer shaft. A row of balls is arranged on at least one ball race arranged against the inner shaft. The ball race is wedge shaped on its against the inner shaft facing surface. The telescopic shaft comprises a prestress mechanism which pushes the ball race along a wedge unit axially in relation to and radially in the direction against the outer shaft. whereby the telescopic shaft is prestressed. The prestress mechanism is arranged to release the prestress when the alteration in length of the telescopic shaft exceeds a predetermined length.

8 Claims, 9 Drawing Sheets

TELESCOPIC SHAFT

TECHNICAL FIELD OF THE INVENTION

The present invention relates to a telescopic shaft for vehicles.

BACKGROUND

Heavier vehicles, e.g. trucks and buses, usually have spring-suspended cabs that move in relation to the chassis of the vehicle whereby these vehicles have a lower steering shaft in the form of a telescopic shaft, which automatically may alter its length during the travel of the vehicle, between the steering wheel and the steering gear as the steering wheel is lockable in its axial direction to the cab of the vehicle whereas the steering gear is fixed to the chassis of the vehicle. The telescopic shaft may be of different kinds but usually comprises an outer shaft and an inner shaft that are axially movable in relation to each other but locked in relation to each other in the direction of rotation of the shaft in order to thereby be able to transfer torque from the steering wheel of the vehicle to the steering gear. General types of telescopic shafts are ball-telescopes with at least two rows of balls between the inner and the outer shaft where the rows of balls are symmetrically arranged around the periphery of the inner shaft and where the balls may both roll and slide, ball-telescopes with circulating balls between the inner and the outer shaft where the balls always roll, such as e.g. is shown in U.S. Pat. No. 3,995,916, needle bearing roller based telescopes with needle rollers between the inner and the outer shaft and with prestress and load limiting devices, and splines-telescopes without balls or rollers where surfaces slide against each other when altering the length of the telescope.

One example of a telescope is shown in U.S. Pat. No. 6,343,993 B1, which shows a telescope where resilient elements on a first shaft press divided ball races against the balls which in turn are pressed against a second shaft.

A problem with a telescope as mentioned above is that heavy demands for a long stroke of the telescopic shaft are put forward for trucks with tiltable cabs in order for the cab to be able to be tilted. E.g., the telescopic shaft according to U.S. Pat. No. 6,343,993 B1 above is designed for short strokes of the order of 30 mm. As the balls of the telescope are spring-loaded, sliding of the balls is prevented wherefore ball races that are of the same length as the stroke are required in order for the balls to be able to roll over the whole stroke. This causes problems with the long strokes that are required for tiltable cabs.

A problem with ordinary ball-telescopes where the balls may both roll and slide is that narrow tolerances are required over the entire stroke which causes problems with the long strokes that are required for tiltable cabs.

SUMMARY OF THE INVENTION

The problem with that a long stroke is required for telescopic shafts in vehicles with tiltable cabs, is solved according to the invention by arranging a telescopic shaft for vehicles that comprises a mechanism which releases the prestress in the telescope when the alteration in length of the telescopic shaft exceeds a predetermined length.

By way of a telescopic shaft that comprises the features described below and recited in the claims, the present invention obtains the advantage that the telescopic shaft shows the possibility of sliding of the balls as in the general ball-telescope, and the advantage of freedom from play between the parts of the telescope as in the prestressed-telescope as a mechanism in the telescope releases the prestress when the alteration in length of the telescopic shaft exceeds a predetermined length is attained. Thus, the invention also attains the advantage that narrow tolerances are not required over the entire length of the telescope.

BRIEF DESCRIPTION OF DRAWINGS

The invention will be described in more detail below with reference to the accompanying drawings, in which.

DESCRIPTION OF PREFERRED EMBODIMENTS

Figure 1:
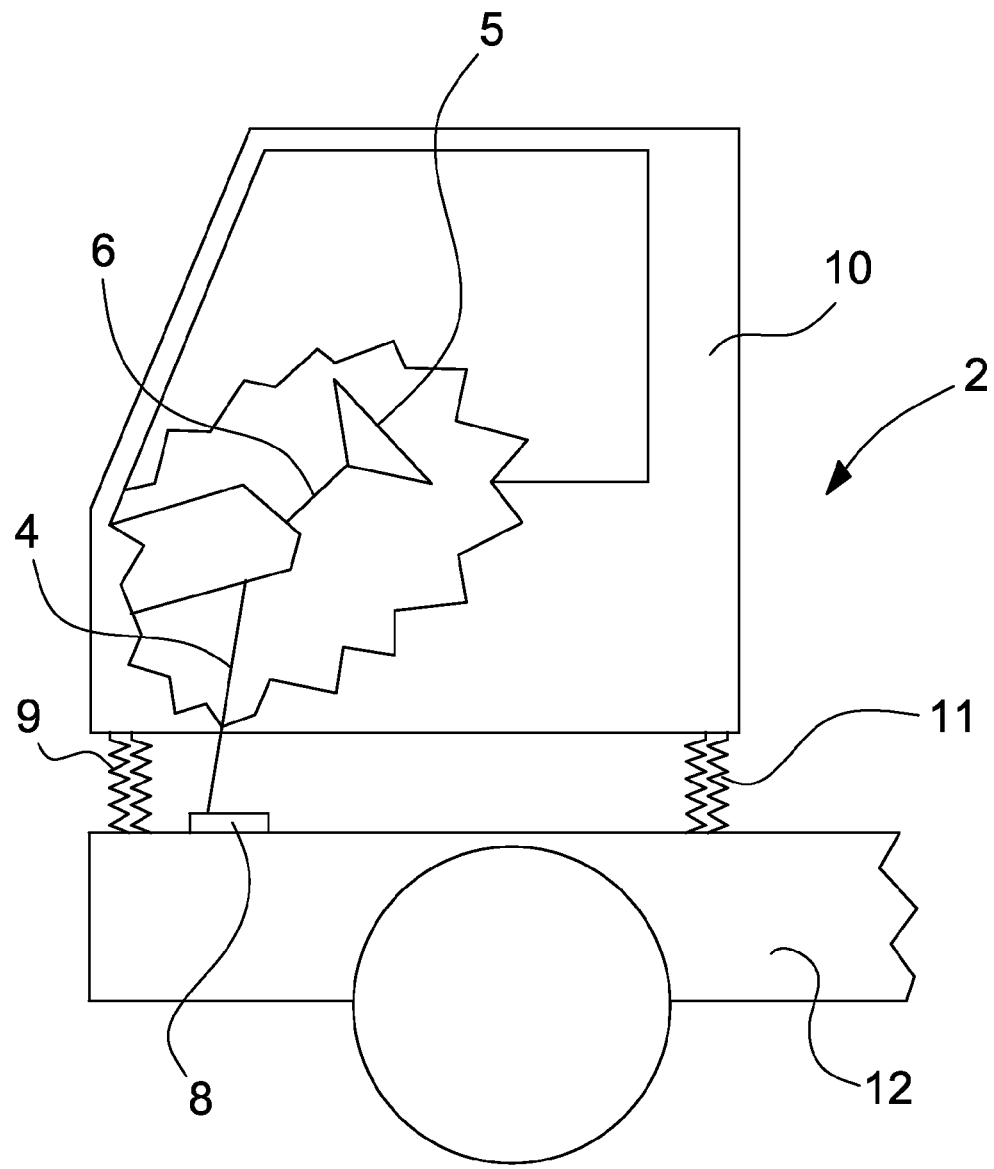
FIG. 1 shows schematically a view partly in section of a vehicle with a telescopic shaft.

Similar reference numerals are used for similar characteristic features in the different figures.

FIG. 1 shows schematically a view partly in section of a vehicle 2 with a lower steering shaft in the form of a telescopic shaft 4, where the telescopic shaft 4 is arranged between the steering wheel 5 of the vehicle 2 and the steering gear 8 of the vehicle 2, preferably between the upper steering shaft 6 of the vehicle 2 and the steering gear 8 of the vehicle 2. The steering wheel 5 is adjustable in relation to the cab 10 of the vehicle 2 in known manner and the steering gear 8 is fixed at the chassis 12 of the vehicle 2. The steering wheel 5 is preferably adjustable by that the upper steering shaft 6 is adjustable, which adjustment preferably is made when the vehicle 2 is stational. The cab 10 is further resiliently suspended in at least two points 9, 11 at the chassis 12 which results in that the telescopic shaft 4 alters its length when the cab 10 moves resiliently in relation to the chassis 12 during travel.

Figure 2:
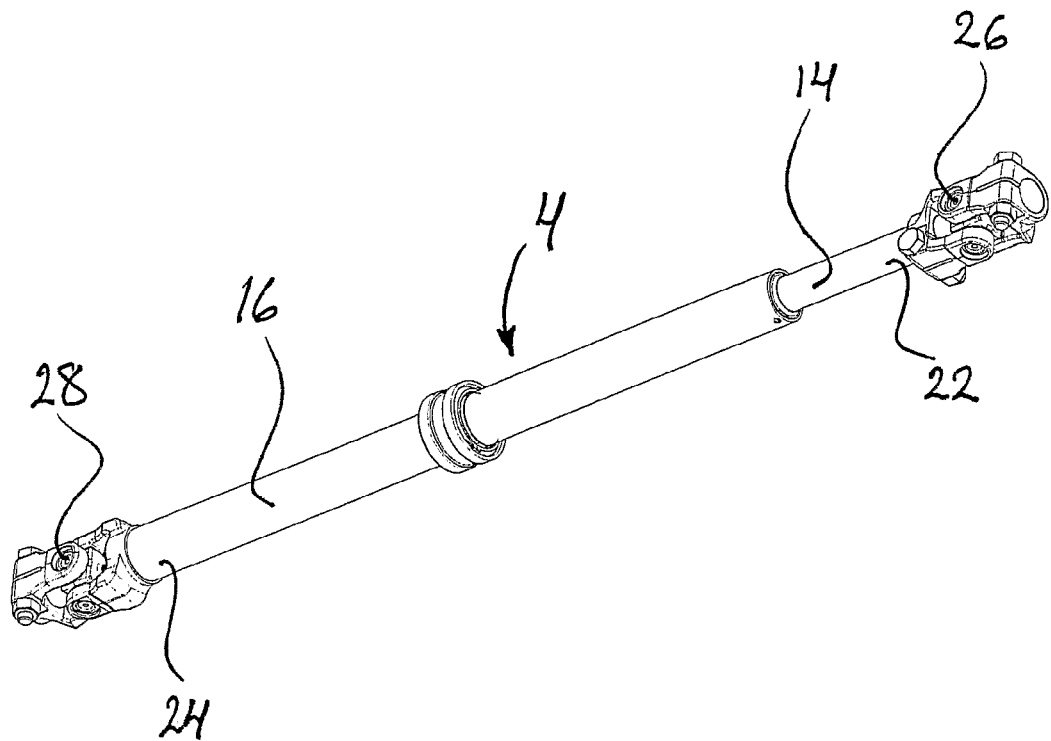
FIG. 2 shows schematically a view of an embodiment of a telescopic shaft according to the invention.

FIG. 2 shows schematically a view of an embodiment of a telescopic shaft 4 according to the invention, where the telescopic shaft 4 comprises an inner shaft 14 and an outer shaft 16 where the inner shaft 14 and the outer shaft 16 are arranged such as a telescope by that the inner shaft 14 is arranged axially movable in the outer shaft 16. The free end 22, 24 of the respective shaft 14, 16 is arranged to be connected to joints 26, 28 in order to enable rotational movement of the telescopic shaft 4. Said joints 26, 28 are e.g. formed as universal joints, cardan joints, constant-speed joints or similar and have connection against upper steering shaft and steering gear respectively. The inner shaft 14 and the outer shaft 16 are preferably tubular but may as an alternative be at least partly solid.

Figure 3:
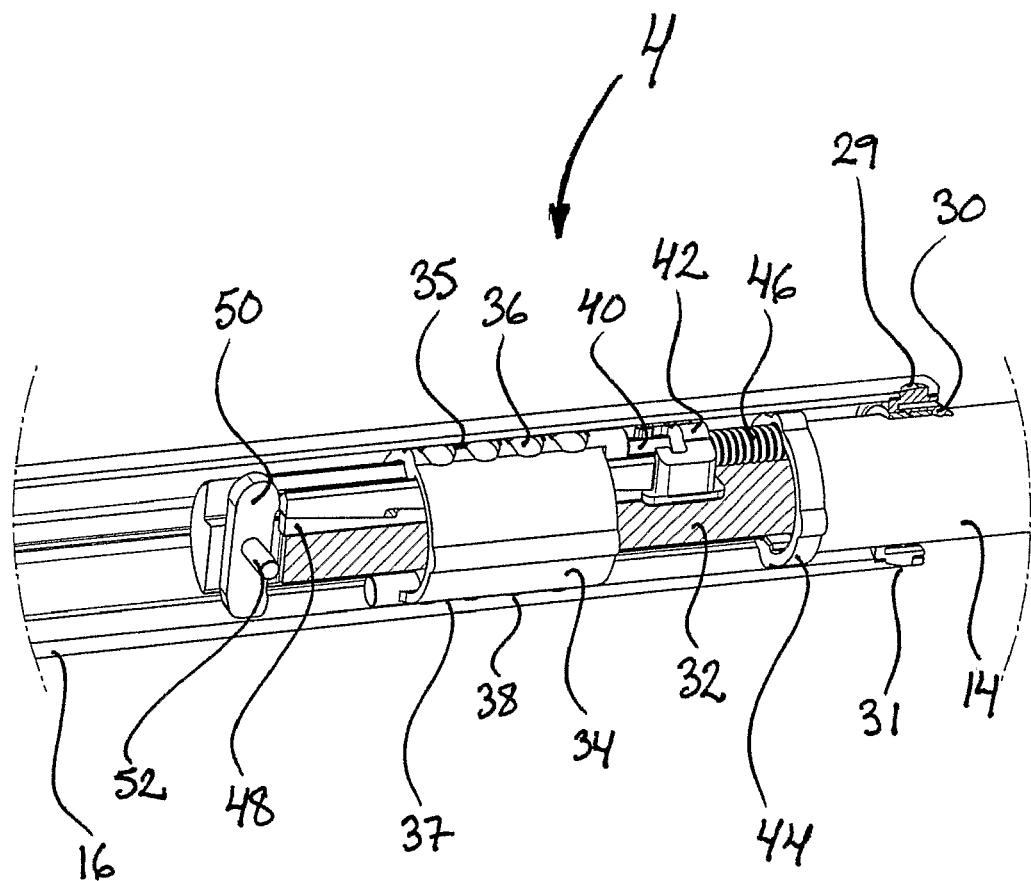
FIG. 3 shows schematically a view partly in section of a telescopic shaft according to the embodiment of the invention shown in FIG. 2.

FIG. 3 shows schematically a view partly in section of a telescopic shaft 4 according to the embodiment of the invention shown in FIG. 2, where the telescopic shaft 4 comprises an inner shaft 14, an outer shaft 16, a sealing 30 which seals between the inner shaft 14 and the outer shaft 16, a mechanism head 32, a ball retainer 34, balls 36, 38, a ball race 40 preferably divided longitudinally, a ball race holder 42, a load limiting device 44, a spring 46 and a wedge unit 48 that generate prestress force, a link arm 50, and a link arm joint 52. The sealing 30 may e.g. be a ring with a supporting part of thermoplastic and a sealing part of resilient material where the sealing is arranged to be snapped into holes 29, 31 in the outer shaft 16 whereby the sealing 30 follows with the outer shaft 16 and moves in relation to the inner shaft 14. The telescopic shaft is provided with at least two rows 35, 37 of balls 36, 38 with at least one ball 36, 38 a row. The load limiting device 44 is a mechanical unit which prohibits rotation between the inner shaft 14 and the outer shaft 16 at a possible ball breakdown. The link arm 50 also works as a protection against the balls rolling out if the ball retainer 34 would brake entirely or if the ball retainer 34 would melt or burn up, which prohibits that the steering ability is lost in such a situation.

Figure 4:
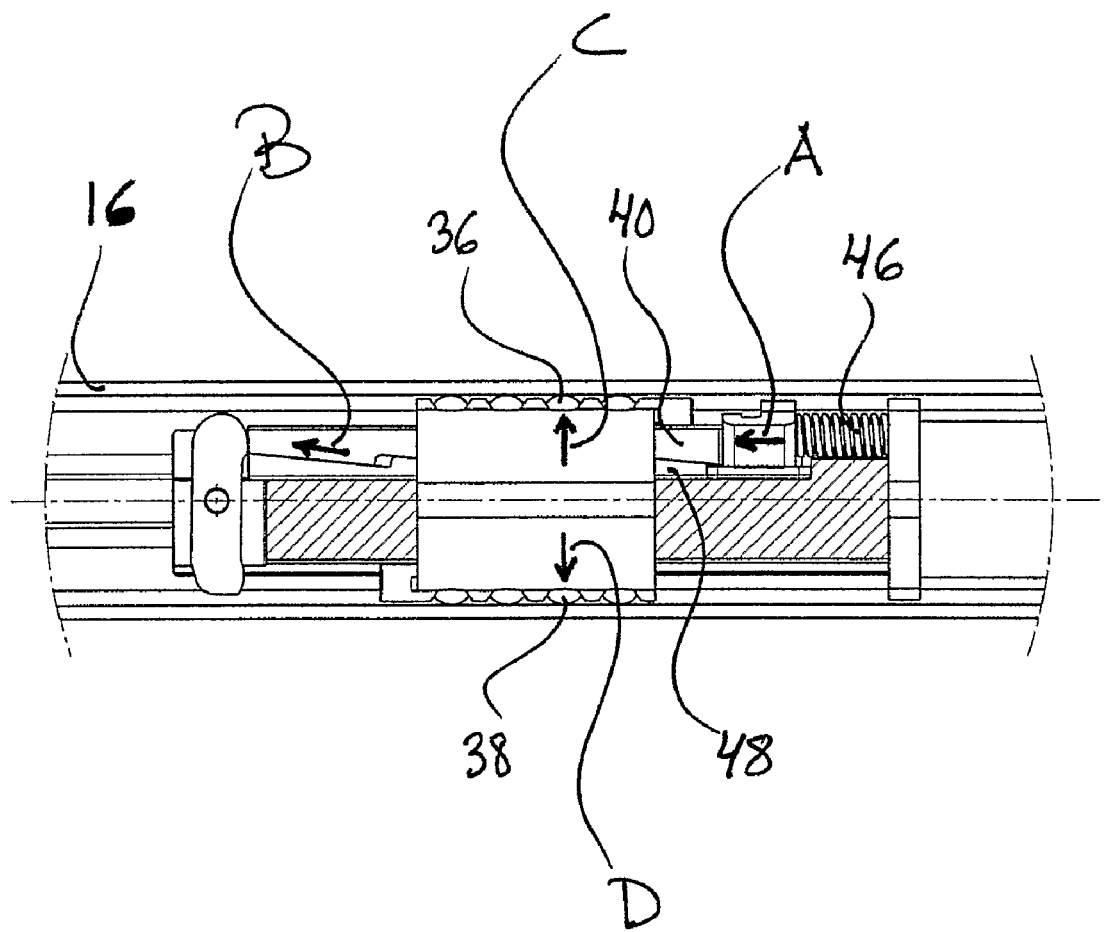
FIG. 4 shows schematically a partial view of FIG. 3.

FIG. 4 shows schematically a partial view of FIG. 3, where the figure shows a spring 46 which generates a force in the direction of arrow A which force presses on the ball race 40 whereby the ball race 40 slides up the wedge unit 48 in the direction of arrow B and presses the balls 36, 38 against the outer shaft 16 in the direction of arrows C and D whereby the telescopic shaft 4 is prestressed. Said prestress may be eliminated either when the telescopic shaft 4 is compressed or extended according to what is described in more detail below.

Figure 5:
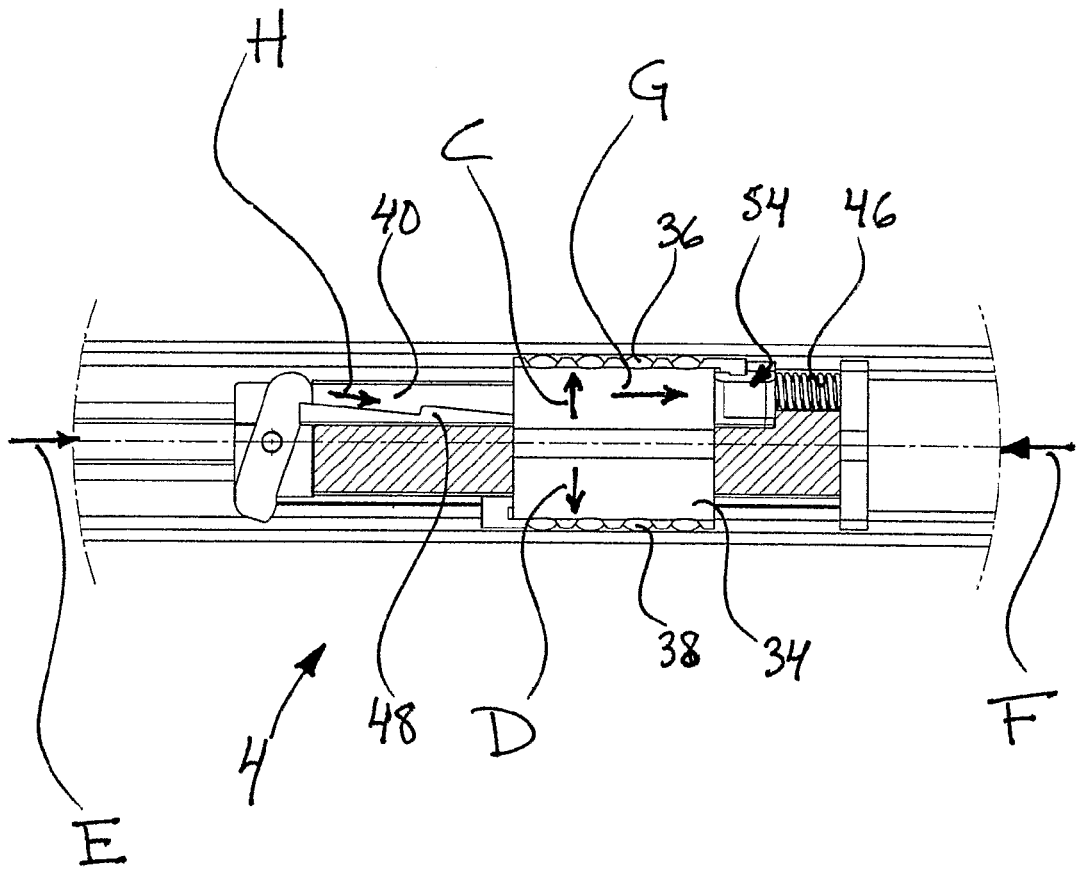
FIG. 5 shows schematically elimination of prestress of the telescopic shaft.

FIG. 5 shows schematically elimination of prestress of the telescopic shaft 4 when the telescopic shaft is compressed. When the telescopic shaft 4 is subjected to a compressing length alteration in the direction of arrows E and F, i.e. when the telescopic shaft 4 is pushed together, the ball retainer 34 moves along the ball race 40 in the direction of arrow G during rolling of the balls 36, 38 until the ball retainer 34 reaches the end 54 of the ball race 40 which thereby compresses the spring 46 whereby the ball race 40 slides down the wedge unit 48 in the direction of arrow H which results in that the prestress which has acted in the direction of arrows C and D is eliminated.

Figure 6:
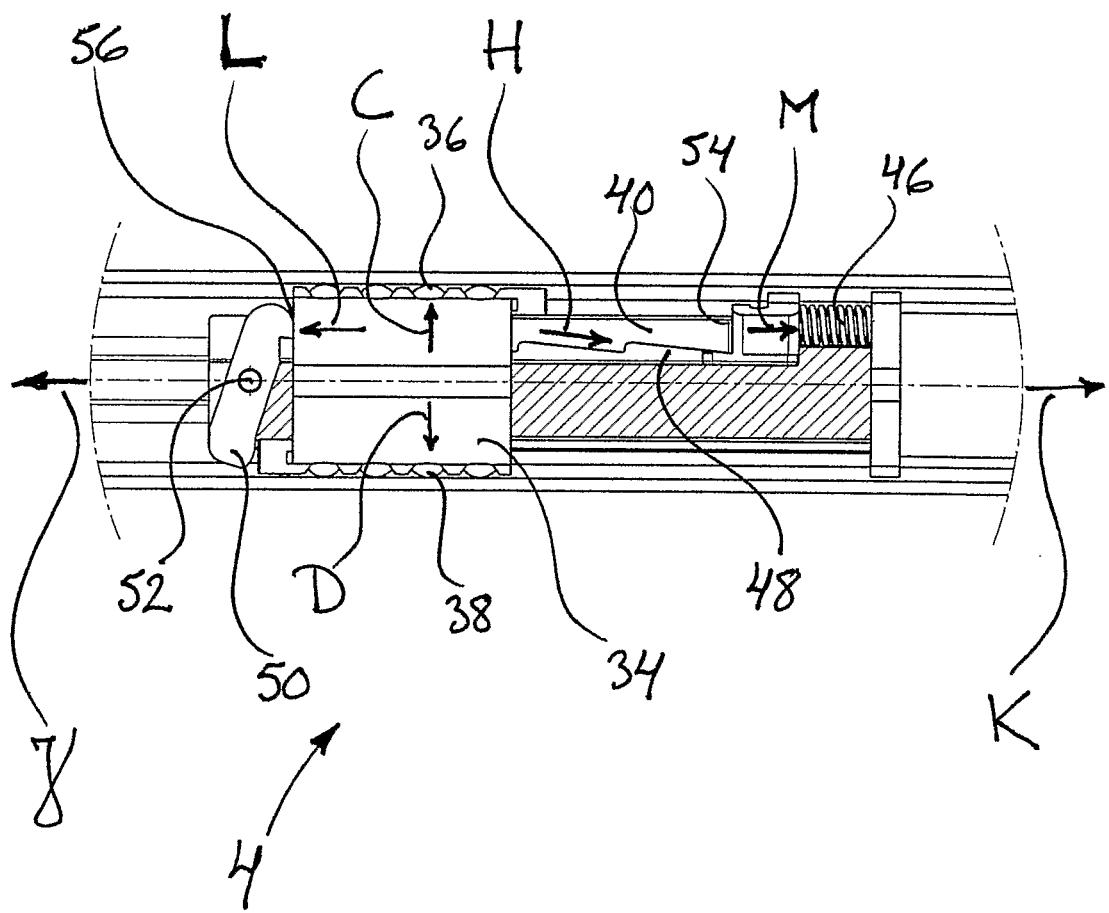
FIG. 6 shows schematically elimination of prestress of the telescopic shaft.

FIG. 6 shows schematically elimination of prestress of the telescopic shaft 4 when the telescopic shaft is extended. When the telescopic shaft 4 is subjected to an extending length alteration in the direction of arrows J and K, i.e. when the telescopic shaft 4 is pulled apart, the ball retainer 34 moves along the ball race 40 in the direction of arrow L during rolling of the balls 36, 38 until the ball retainer 34 reaches the link arm 50 which in turn via the link arm joint 52 pushes against the end 56 of the ball race 40 whereby the other end 54 of the ball race 40 thereby compresses the spring 46 in the direction of arrow M whereby the ball race 40 slides down the wedge unit 48 in the direction of arrow H which results in that the prestress which has acted in the direction of arrows C and D is eliminated.

Figure 7:
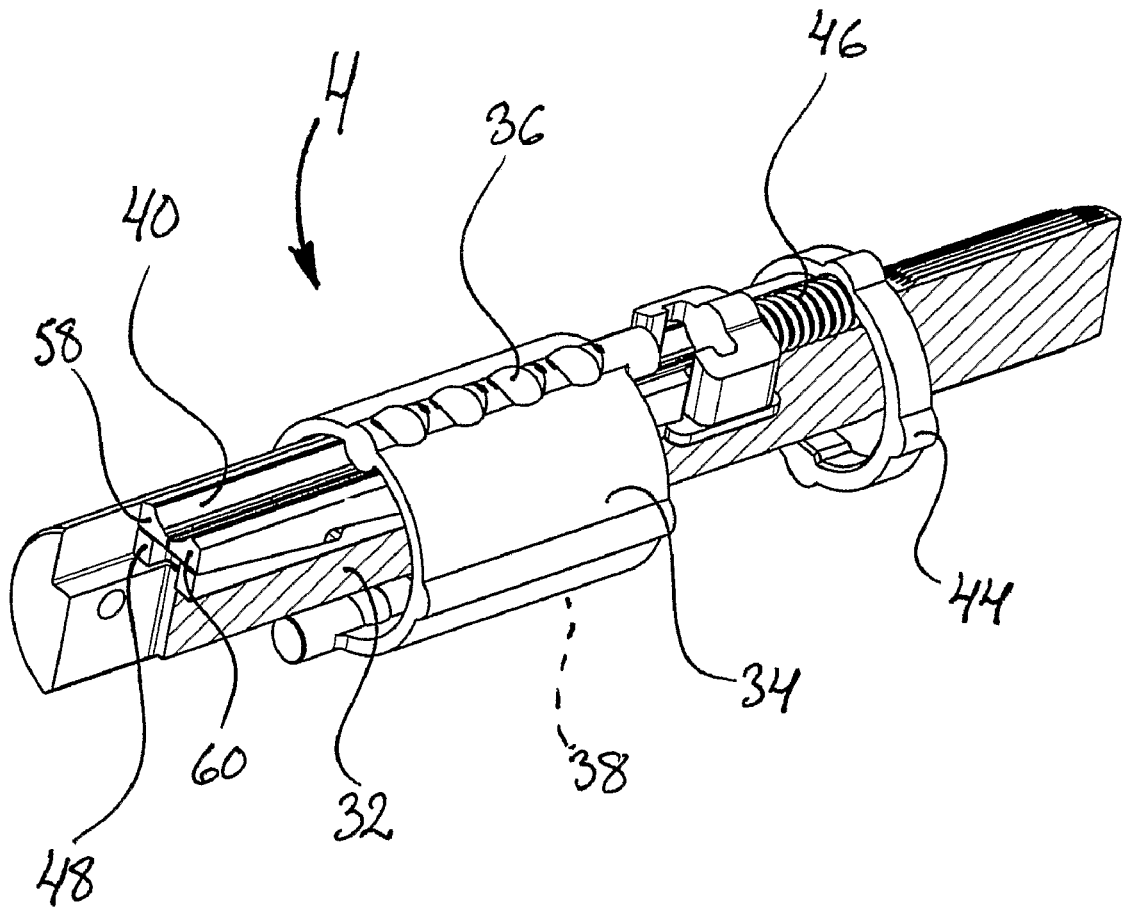
FIG. 7 shows schematically a part of the telescopic shaft shown in FIG. 3.

FIG. 7 shows schematically a part of the telescopic shaft 4 shown in FIG. 3, where the telescopic shaft 4 comprises a holder arranged to be arranged inside the inner shaft, a mechanism head 32, a ball retainer 34, balls 36, 38, a ball race 40 divided longitudinally, a ball race holder, a load limiting device 44, and a spring 46 and a wedge unit 48 that generate prestress force. By that the ball race 40 is divided longitudinally and thus comprises two separate ball race units 58, 60, possible play between ball race 40 and wedge unit 48 respectively mechanism head 32 is eliminated as will be described in more detail below at the same time as the play between the inner shaft and the outer shaft (not shown) is eliminated.

Figure 8:
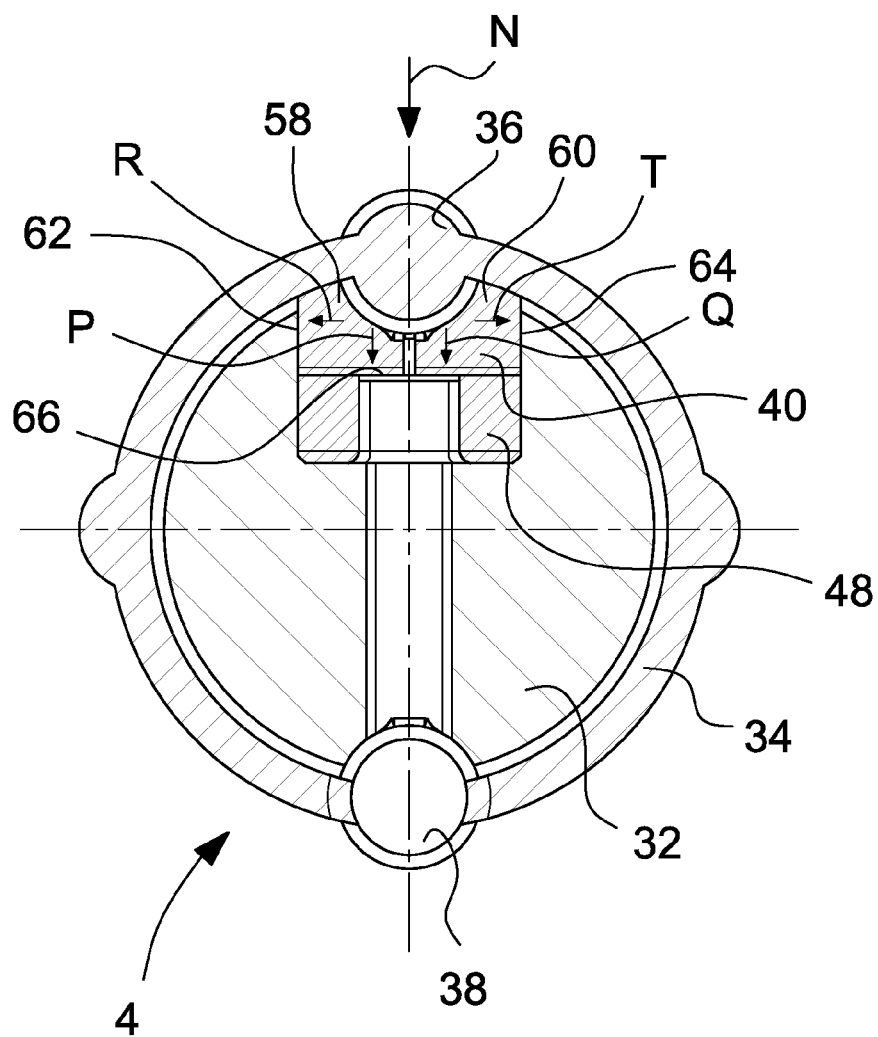
FIG. 8 shows schematically a cross-section of a part of the telescopic shaft shown in FIG. 7.

FIG. 8 shows schematically a cross-section of a part of the telescopic shaft 4 shown in FIG. 7, where the telescopic shaft 4 comprises a mechanism head 32, a ball retainer 34, balls 36, 38, a ball race 40 divided longitudinally, and a wedge unit 48. By that the ball race 40 is divided longitudinally and thus comprises two separate ball race units 58, 60, possible play between ball race 40 and wedge unit 48 respectively mechanism head 32 is eliminated at the same time as the play between the inner shaft and the outer shaft (not shown) is eliminated, as when the prestress mentioned above pushes on the balls 36, 38 in the direction of arrow N, the ball race 40, i.e. the ball race units 58, 60, will be pushed on one hand against the center of the inner shaft and the mechanism head 32 in the directions of arrows P, Q and on the other hand against the sides 62, 64 of the groove 66 in which the ball race 40 is arranged in the direction of arrows R, T whereby no play remains between the ball race 40, i.e. the ball race units 58, 60, and the wedge unit 48 respectively the mechanism head 32. As can be seen, the prestress mechanism is only arranged at one row of balls 36.

Figure 9:
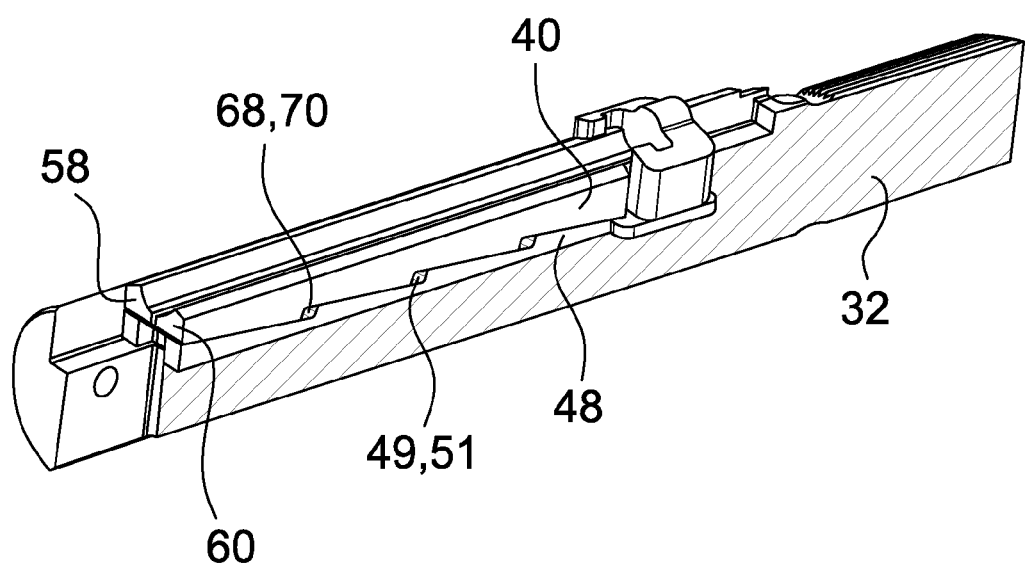
FIG. 9 shows schematically a part of the telescopic shaft 4 shown in FIG. 3.

FIG. 9 shows schematically a part of the telescopic shaft shown in FIG. 3. The figure shows an embodiment of the above mentioned wedge unit 48, where the wedge unit 48 is arranged as a part separated from the mechanism head 32. The ball race 40, i.e. the ball race units 58, 60, are according to this embodiment arranged at their under side 70 with an inclined surface 68 corresponding to that on the upper side 49 of the separate wedge unit 48 arranged inclined surface 51 whereby the ball race 40 may slide axially and radially in relation to the mechanism head 32, this in order to simplify the manufacture of the ball race 40 and the mechanism head 32. As an alternative, the wedge unit 48 may be an integrated part of the mechanism head 32.

The invention thus relates to a telescopic shaft for vehicles comprising an inner shaft 14 axially movable in an outer shaft 16, where the telescopic shaft 4 comprises at least two rows 35, 37 of balls 36, 38 with at least one ball 36, 38 a row 35, 37 between the inner shaft 14 and the outer shaft 16, where a row 35 of balls 36 is arranged on at least one ball race 40 arranged against the inner shaft 14, where the ball race 40 is wedge shaped on its against the inner shaft 14 facing surface and that the telescopic shaft 4 comprises a prestress mechanism 46 which pushes the ball race 40 along a wedge unit 48 axially in relation to and radially in the direction against the outer shaft 16 whereby the telescopic shaft 48 is prestressed and that the prestress mechanism 46 is arranged to release the prestress when the alteration in length of the telescopic shaft 4 exceeds a predetermined length.

The invention claimed is:
1. Telescopic shaft for vehicles, comprising:
an inner shaft axially movable in an outer shaft;
at least two rows of balls with at least one ball a row between the inner shaft and the outer shaft, where a row of balls is arranged on at least one ball race arranged against the inner shaft, wherein the ball race is wedge shaped on its against the inner shaft facing surface;
a prestress mechanism which pushes the ball race along a wedge unit axially in relation to and radially in the direction against the outer shaft whereby the telescopic shaft is prestressed; and
a ball retainer which is movable in relation to the ball race, the ball retainer reaching an end of the ball race when the alteration in length of the telescopic shaft exceeds a predetermined length, and wherein the ball retainer, when it reaches said end of the ball race, is arranged to influence the prestress mechanism so that the ball race slides along the wedge unit whereby the prestress is eliminated.

2. Telescopic shaft as claimed in claim 1, wherein the prestressing mechanism is a spring which generates a force which force presses on the ball race whereby the ball race slides up the wedge unit and presses the balls against the outer shaft whereby the telescopic shaft is prestressed.

3. Telescopic shaft as claimed in claim 1, wherein the prestress of the telescopic shaft is arranged to be eliminated by that when the telescopic shaft is subjected to a compressing length alteration the ball retainer is arranged to move along the ball race during rolling of the balls until the ball retainer reaches the end of the ball race which thereby influences the prestressing mechanism whereby the ball race slides along the wedge unit which results in that the prestress is eliminated.

4. Telescopic shaft as claimed in claim 1, wherein the prestress of the telescopic shaft is arranged to be eliminated by that when the telescopic shaft is subjected to a extending length alteration the ball retainer is arranged to move along the ball race during rolling of the balls until the ball retainer reaches a link arm which in turn via a link arm joint influences the end of the ball race whereby the other end of the ball race thereby influences the prestressing mechanism whereby the ball race slides along the wedge unit which results in that the prestress is eliminated.

5. Telescopic shaft as claimed in claim 4, wherein possible play between ball race and wedge unit is eliminated by the ball race units arc being arranged to be pushed on one hand against the center of the inner shaft and on the other hand against the sides of a groove in which the ball race is arranged when the telescopic shaft is prestressed.

6. Telescopic shaft as claimed in claim 1, wherein the ball race is divided longitudinally and thus comprises two separate ball race units whereby possible play between the ball race and the wedge unit is eliminated at the same time as the play between the inner shaft and the outer shaft is eliminated by that they are prestressed.

7. Telescopic shaft as claimed in claim 1, wherein the wedge unit is arranged as a part of a mechanism head.

8. Telescopic shaft as claimed in claim 1, wherein the telescopic shaft is arranged between the steering wheel of the vehicle and the steering gear of the vehicle.

* * * * *